United States Patent Office 3,298,990
Patented Jan. 17, 1967

3,298,990
DISPERSION OF A VINYL POLYMER IN AN ORGANIC LIQUID CONTAINING A REACTIVE PLASTICIZER
Richard Henry Cousens, Gerrards Cross, and Desmond Wilfrid John Osmond, Iver Heath, England, and David Henry Solomon, Glen Waverley, Australia, assignors to Imperial Chemical Industries Limited, London, England, a corporation of Great Britain
No Drawing. Filed May 1, 1961, Ser. No. 127,760
Claims priority, application Great Britain, May 4, 1960, 15,829/60
14 Claims. (Cl. 260—30.4)

This invention relates to dispersions of vinyl polymers suitable for use as coating compositions and to processes of applying such compositions.

It is known to plasticize hard vinyl polymers such as polyvinyl chloride with solvent-type plasticizers such as octyl phthalate. Whilst such plasticizers effectively soften the polymer, the compositions are purely physical mixtures and consequently the plasticizer is readily removed by leaching or by volatilisation. Such plasticized compositions are, therefore, of restricted utility in conditions in which the plasticizer is likely to be extracted or driven off.

The problem of producing permanently soft compositions based on vinyl polymers has, to a certain extent, been overcome by producing "internally plasticized" polymers, i.e., by polymerising a mixture of monomers to produce copolymers in which the nature and proportion of different monomer units in the polymer chain are so chosen as to produce an inherently soft polymer which does not need to be compounded with a plasticizer. Although the preparation of such polymers may involve some difficulties, particularly when using dispersion polymerisation techniques, these "internally plasticized" copolymers have, in fact, so far been the only practical alternative to compositions comprising hard polymer and solvent-type plasticizer.

Dispersions of vinyl polymers in organic liquids in which they are insoluble are becoming of increasing importance in the manufacture of coating compositions. In such compositions it is advantageous to have a solvent-type plasticizer present in the organic liquid continuous phase during formation of the coating since the plasticizer improves the rheological characteristics of the wet film and assists in integration of the discrete particles of polymer into a continuous film. However, the final film as plasticized with solvent-type plasticizer is subject to the disadvantages referred to above.

On the other hand, if an "internally plasticized" vinyl copolymer is used it is more difficult to ensure that the disperse particles become fully integrated in the absence of an external plasticizer. Further, in many copolymers of commercial importance, the groups which result in the copolymer being softer also render it more soluble and consequently it is more difficult, as a result of the higher solubility of the copolymer, to prepare a dispersion in the first place.

We have now found that where it is desired to plasticize a vinyl polymer, i.e., cause the polymer in its final state to be softer than it otherwise would be, it is possible to compound a dispersion of selected type of vinyl polymer with a second component to form a physical mixture in which, during evaporation of the dispersion medium, the second component functions as a "solvent-type" plasticizer for the polymer, and then, at a suitable stage in the application of such mixtures, to react these two components to produce a plasticized vinyl polymer in which the plasticizer is chemically bound and consequently is not removable by physical processes such as solvent extraction or volatilisation.

The essential requirement of the selected vinyl polymer is that it contains a group capable of reacting in the integrated film with the second component, either directly or through a third reactive component. The essential requirements of the second component are that it is a liquid or softer solid compatible with the polymer and soluble in the dispersion medium and that it also contains a group which will react with the vinyl polymer in the integrated film.

Preferably the second component has a molecular weight of at least 200 otherwise it is too volatile and tends to evaporate with the dispersion medium before it is reacted with the vinyl polymer. On the other hand its molecular weight should not be greater than 800 otherwise it may not be both soluble in the dispersion medium and compatible with the vinyl polymer and, in any case, its rate of migration into the polymer particles may be too slow for practical purposes. Preferably, its molecular weight is in the range 300–600. Its precise chemical nature is dictated by the polymer with which it is to be used.

In the application of the coating composition the second component is in solution in the dispersion medium and does not migrate into the polymer to any marked degree before evaporation of the medium. When nearly all the medium has evaporated, the second component begins to migrate into the polymer particles and film integration begins. The effect of heat on the coating at this stage is to assist film integration and also to react the polymer and second component which are then in intimate association.

The third component, if present, may be in solution with the second component in which case it will migrate on film integration as described above. Alternatively, it may be incorporated in the polymer particles during preparation of the dispersion as described in co-pending application No. 76,116, now Patent No. 3,261,788.

Catalysts may also be used in appropriate systems to accelerate the reaction of the vinyl polymer with the second or third component.

It is also possible to make use of reactions which normally proceed at room temperature provided that the reactive groups in the polymer and second and, optionally, third components are masked or shielded from each other until the integrated film is formed. This may be done by methods described later.

The present invention, therefore, provides a coating composition comprising a volatile organic liquid containing in dispersion a reactive vinyl polymer and, in solution, a second component which is a "solvent-type" plasticizer for the polymer and which, in the integrated film can be chemically combined with the polymer either directly or through a third component.

The present invention also provides a method of producing a coating of plasticized vinyl polymer by applying to an article to be coated a composition comprising a volatile organic liquid containing in dispersion a reactive vinyl polymer and, in solution, a second component which is a "solvent-type" plasticizer for the polymer, and heating the article to evaporate organic liquid and cause integration of the disperse polymer into a film in which chemical combination of the polymer and second component occurs, optionally through a third reactive component.

This invention is of particular value when it is desired, in the application of vinyl polymer coating composition, to crosslink the polymer to reduce thermoplasticity and improve solvent- and detergent-resistance. Such crosslinking is commonly carried out on "internally plasticized" copolymers but in the case of polymers plasticized with solvent-type plasticizer, although a reduction in thermoplasticity and solvent-sensitivity may be desirable, crosslinking to any substantial degree cannot be carried out due to danger of syneresis of the plasticizer.

In the application of the present invention crosslinking of the polymer may be achieved by use of a polyfunctional second component or by the use of a polyfunctional third component which will react with the polymer and with the second component or by the use of a conventional crosslinking agent for the polymer. In this way it is possible to produce a polymer which in its final state is tougher, less thermoplastic and more solvent-resistant than the original disperse polymer, but which is softened or made flexible by a chemically combined plasticizer.

In compositions in which the second component combines directly with the polymer, plasticizing only may be achieved by using a mono-functional second component or less desirably by using such a stoichiometrical excess of a polyfunctional second component that in effect only one active group in each molecule of the second component has the opportunity to react. As this excess of second component is reduced, crosslinking begins to occur, the degree of crosslinking increasing until the stoichiometric proportion of the two components is reacted. Plasticizing will, of course, still occur to a degree dependent on the length and flexibility of the crosslink between the polymer molecules. Generally, however, it is preferred to use a stoichiometric excess of reactive groups in the polymer so as to ensure as far as possible that all the second component in the film becomes chemically combined.

In order to effect a useful degree of plasticization at the film integration stage it is necessary that "solvent-type" plasticizer be present in proportion at least 25% by weight of the polymer. The proportion is preferably about 50% but may be as high as 100%.

Where crosslinking is to occur through the second component the proportion of polyfunctional material required to crosslink the polymer to the required degree will probably be less than that required to plasticize the polymer both at the film integration stage and in its final combined form. In one embodiment of the invention, therefore, the second component comprises a mixture of monofunctional and polyfunctional materials which react with the polymer to produce a film of plasticized crosslinked polymer. In this way the film may be rendered more solvent resistant and less thermoplastic by crosslinking and yet be of adequate softness and flexibility as the result of the presence or plasticizing groups.

The polymer and second component may be directly combined by means of an ester linkage, e.g. by reacting epoxy groups on the one with carboxyl or acid anhydride groups on the other or by reacting acid anhydride groups on the one with hydroxyl groups on the other.

In a system in which there is to be combination of epoxy and carboxyl groups the vinyl polymer may contain the latter, for example methyl methacrylate/methacrylic acid copolymer, and may be plasticized with an epoxy compound, for example glycidyl octoate. Crosslinking could be effected by use of diglycidyl sebacate, either in combination with the mono-functional glycidyl octoate or alone as described above. The carboxyl-containing copolymer would be dispersed in white spirit or mixtures thereof with xylol and since both these epoxy compounds are soluble in this disperse phase and compatible with the polymer they will function as solvent-type plasticizer and assist in film-integration on application of the coating composition and evaporation of the organic liquid. On heating the film the epoxy and carboxyl groups can be made to react to cause chemical combination of the two components, the sebacate or octoate groups still effectively plasticizing the polymer. Preferably a basic catalyst such as a complex organic base is incorporated in the coating composition to assist the reaction.

In an alternative epoxy/carboxyl group system the epoxy may be in the polymer, which may be, for example, a glycidyl methacrylate/methyl methacrylate copolymer, and the carboxyl group may be in the second component, for example monobutyl adipate or sebacate. Crosslinking could be effected by the use of adipic or sebacic acid.

The combination of epoxy and acid anhydride groups may be practised using epoxy-containing components as above. Where the polymer contains the epoxy group the second component may be, for example, a maleinised fatty acid or preferably a lower alkyl ester thereof, or where crosslinking is desired, a maleinised oil. Where the second component contains the epoxy group the polymer may be, for example, an itaconic anhydride/methacrylate copolymer.

The combination of acid anhydride and hydroxyl groups may be practised using acid anhydride-containing components as above. Where the polymer contains the anhydride group the second component may be, for example, tributyl citrate or, where crosslinking is desired, dibutyl tartrate. Where the second component contains the anhydride group the polymer may contain, for example, a glycol monomethacrylate component.

Another two-component system is one in which a methylolacrylamide/methyl methacrylate copolymer is used in conjunction with a hydroxyl-containing second component as described above, or in which a methylol derivative of the amide of octoic acid and, where crosslinking is required, the methylol derivative of the amide of sebacic acid is used in combination with a hydroxyl-containing polymer as described above.

Where the polymer is prepared in accordance with copending application No. 44,840 it is possible to use a polymer in which the reactive groups are located in the core of the disperse polymer particles and so are not available for reaction until the film is formed and the second component migrates throughout the polymer. In this case it is possible to use in the second component particularly reactive groups which would otherwise react in the dispersion before application of heat and integration of the film.

An example of such a two-component system is one in which the reactive groups are amine and epoxy. Where the polymer contains the epoxy group this may be one in which the core of the polymer particles consists of a glycidyl copolymer as described above, the second component being, for example, an alkyl amine such as dilauryl amine. Where the polymer contains the amine group this may be one in which the core of the polymer particles consists of an ammoniated glycidyl methacrylate/acrylate copolymer, the second component being an epoxy-containing compound as exemplified above.

Other examples are ones in which the dispersed polymer particles contain in the core hydroxyl, carboxyl, amine or amide groups and the second component is a mono-isocyanate- and, where crosslinking is desired, a polyisocyanate-containing material.

Alternatively the particularly reactive isocyanate groups may be masked to prevent reaction until the coating is heated.

As an alternative to two-component systems, the present invention also includes three-component systems in which the polymer and plasticizing component are combined through a third component which will react with both. This third component may also function as a solvent-type plasticizer at the film-integration stage. Since the third component must be at least bi-functional it is usually the case that these systems necessarily involve some degree of crosslinking in the final stage depending on the relative ease of reaction of the polymer and second component with the third component.

For example, the third component may be an alcohol-modified urea-formaldehyde condensate which will react with hydroxyl groups in the polymer and second component. It may also be an alcohol-modified melamine-formaldehyde condensate which will react with hydroxyl and carboxyl groups. Since the polymer has a higher degree of functionality than the second component the balance of reactivity should be tilted as far as possible in favour of the second component, i.e., since the melamine-formaldehyde condensate will react more readily with a hydroxyl group than with a carboxyl group, then preferably the polymer contains carboxyl groups and the second component hydroxyl groups.

The carboxyl- and hydroxyl-containing polymer and second component may be as exemplified above.

In the case of melamine-formaldehyde condensate, other active groups such as amine and amide groups, may be used as reactive points in the polymer and second component.

Other useful systems are possible using polyisocyanate as the third component. This may be used to react with carboxyl, hydroxyl, amine and amide groups in the polymer and the second component. The polymer and second component may contain the same or different reactive groups and since the polyisocyanate reacts readily with any of them, the nature of the final product, i.e. degree of crosslinking and plasticizer attachment, is largely determined by the relative proportions and functionality of the reactants. In fact, it is necessary in this system to use a masked polyisocyanate in the coating composition to prevent reaction until the film is heated.

Another three-component system involves the use of a phenol formaldehyde condensate to link an epoxy-containing vinyl polymer to a second component containing conjugated double bonds, e.g., dioctyl maleate.

Vinyl polymers having a molecular weight of from 50,000 to 250,000 (as determined by viscosity measurement) are suitable for use in the coating compositions of the present invention. Those of molecular weight 50,000 to 100,000 are useful where the compositions are to be heated at 75–100° C. on application and those of molecular weight 100,000 to 250,000 are useful where the compositions are to be heated at 100–150° C. on application. If the polymer is to be crosslinked on application, molecular weights in the lower part of the range, i.e., from 50,000 to 150,000, are preferred since better film integration is then obtainable.

The degree of functionality, i.e., the proportion of reactive groups, required in the vinyl polymer will depend mainly on the molecular weight and functionality of the second and third components since the weight proportions of the components are largely determined by the degree of plasticizing required.

For example, in a two-component system in which no crosslinking is to take place a carboxyl-containing polymer such as a methyl methacrylate/methacrylic acid copolymer of molecular weight 200,000 might be used in conjunction with butyl glycidyl sebacate as a mono-functional plasticizer present in a proportion of 60% by weight. The molecular weight of the second component is 314 and consequently, in order to react with all of this component, the polymer would need to have a functionality of at least 380. A suitable copolymer would, therefore, be one containing ester and acid in a proportion of about 80:20.

A similar ratio is required where the molecular weight of the polymer is 100,000 and crosslinking is to take place through diglycidyl sebacate present in the second component. A suitable degree of crosslinking is one involving about 25 links per polymer molecule, but this represents a proportion of only 4% by weight of diglycidyl sebactate. If 50% by weight of "solvent-type" plasticizer is required at the film integration stage then about 46% by weight of mono-functional butyl glycidyl sebacate will also be required in the second component. To react with this the polymer requires to have a further 150 carboxyl groups per molecule and so its total functionality needs to be about 175. This requirement is met by a polymer containing ester and acid in a proportion from 85:15 to 80:20.

In three-component systems in which the third component is also a film-former, film integration is facilitated by the fact that whereas, in the final state, it is the erstwhile second component which has the major plasticizing effect, the third component also may act as a "solvent-type" plasticizer at the film integration stage.

For example, when the third component is a melamine-formaldehyde condensate the coating composition may contain polymer, second component and third component, in a weight proportion of, say, 100:65:35, respectively. At the film integration stage the polymer: "solvent-type" plasticizer ratio would be 100:100, a high proportion conducive to good film integration, whereas at the final stage in which the melamine-formaldehyde has also polymerised, the effective polymer:plasticizer ratio would be 135:65.

The invention is particularly applicable to dispersions of acrylate polymers, by which we mean polymers and copolymers comprising acrylic or methacrylic acid or an ester, amide or nitrile of such an acid. Typical materials which are suitable as monomers in this invention include acrylonitrile, acrylates and methacrylates of aliphatic alcohols such as ethyl, octyl, lauryl and natural fat alcohols. The preferred monomers for use in the production of polymers for the preparation of coating compositions by this process are methyl methacrylate, β-ethoxy ethyl methacrylate, ethyl acrylate, acrylonitrile, methacrylic acid and acrylic acid, and amides of these acids. Combinations of the above monomers may be used and other typical materials which are suitable for use as comonomers include dimethyl itaconate, diethyl maleate and maleic anhydride.

EXAMPLE 1

A. *Preparation of dispersion of 80:20 methyl methacrylate:maleic anhydride copolymer*

The following ingredients were charged to a 3-litre glass reactor equipped with stirrer, reflux condenser, heating and cooling coils, batch thermometer and pressure sampling line:

|  | Parts by weight |
|---|---|
| Methyl methacrylate | 380 |
| Maleic anhydride | 190 |
| White spirit | 352 |
| Petroleum ether (60–80° C.) | 543 |
| Benzoyl peroxide | 0.5 |
| Rubber (degraded to reduced viscosity in benzene of about 0.4 unit) | 21 |
| Primary octyl mercaptan | 2.5 |

The maleic anhydride was first dissolved by warming with the methyl methacrylate and then the whole charge was reacted under reflux at 90° C. for 3 hours, when the total conversion was greater than 80% and the conversion of maleic anhydride was approximately 35%. The batch was cooled under nitrogen to 90° C. and the following second stage added:

|  | Parts by weight |
|---|---|
| Methyl methacrylate | 380 |
| Benzoyl peroxide | 0.7 |
| Primary octyl mercaptan | 2.5 |

The batch was again reacted at reflux temperature (approximately 90° C.) for 2 hours when the conversion, both total and of maleic anhydride, were greater than 80%. The batch was cooled under nitrogen to approximately 0° C. and filtered, which removed, as a crystalline solid, the greater part of the unreacted maleic anhydride. Final solids were 43%, polymer molecular weight estimated as approximately 100,000 and polymer particle size approximately 0.3μ.

B. Plasticization of dispersion

Portions of the dispersion of methyl methacrylate/maleic anhydride copolymer prepared as described above were blended with three plasticizers as follows.

Into 100 parts of dispersion were stirred (a) 42 parts of a 50% solution in toluol of a conventional plasticizer, butyl benzyl phthalate, (b) 42 parts of a 50% solution in toluol of a monohydroxyl plasticizer, tetraglycerol pentabutyl ether (probably in fact containing small amounts of poly —OH compounds) and (c) 42 parts of a 50% solution in toluol of a mixed polyhydroxyl plasticizer, nominally tetraglycerol tetrabutyl ether.

In each case a small amount of a strong organic base was added.

Films were poured on glass, tin-plate and weighed strips of aluminium foil (the latter in quadruplicate) and stoved at 150° C. for 30 minutes (An oven with a very low rate of air circulation was used to reduce the losses of plasticizer, especially in case (a).)

The foil strips were reweighed and two each immersed in (i) 1:1 toluene:80–100° C. petroleum, (ii) 1:1 toluene:acetone, for 30 minutes, dried and reweighed and the percentage loss in weight calculated.

The results obtained are tabulated below:

| | Appearance | General Properties | Percentage extracted | |
|---|---|---|---|---|
| | | | In (i) | In (ii) |
| (a) | Clear and glossy | Reasonably flexible, not very tough, slightly thermoplastic. | *23 | 100 |
| (b) | As (a) | As (a) | 2 | 75 |
| (c) | As (a) | Slightly less flexible than (a) but extremely hard and tough. Not thermoplastic. | <1 | 18 |

*If no plasticizer were lost during stoving the theoretical maximum percentage loss on (i) extraction would be 33%.

(b) and (c) show that chemical combination of the polymer and second component reduces drastically the loss on immersion in solvent mixture (i), which loss is assumed to represent the loss of plasticizer by leaching. This improvement is obtained without substantial loss of plasticizing effect. The stronger solvent mixture (ii) also tends to dissolve polymer and (c) shows the effect of the crosslinking obtained by use of a polyfunctional second component.

EXAMPLE 2

A. Preparation of dispersion of 85:15 methyl methacrylate:methacrylic acid copolymer The following charge was heated in the apparatus of Example 1:

| | Parts by weight |
|---|---|
| Methyl methacrylate | 1000 |
| Xylol | 550 |
| 60–80° C. petroleum | 550 |
| Methacrylic acid | 90 |
| Rubber (degraded to reduced viscosity in benzene of about 0.4 unit) | 48 |
| Benzoyl peroxide | 3 |
| Primary octyl mercaptan | 7.3 |

This mixture was reacted under reflux (approximately 90° C.) for three hours, starting 15 minutes after reaching 90° C., 90 parts additional methacrylic acid were dripped into the batch over about two hours. The incoming feed was arranged to mingle with the reflux stream to avoid coagulation of the latex. Samples drawn at intervals indicated that the polymer contained at all stages lay between 10% and 18% methacrylic acid.

B. Plasticization of dispersion

Portions of the dispersion of methyl methacrylate/methacrylic acid copolymer prepared as described above were blended with a variety of plasticizers, basic catalyst was added and films were prepared and tested in solvent mixtures as in Example 1. The plasticizers used were:

(a) Dibutyl sebacate;
(b) Octyl glycidyl sebacate containing between 10% and 20% diglycidyl sebacate;
(c) Isopropyl glycidyl sebacate containing between 10% and 20% diglycidyl sebacate;
(d) Octyl glycidyl phthalate.

In each case sufficient plasticizer to give a ratio of polymer solids:plasticizer of 2:1 was taken, dissolved in its own weight of 1:1 toluene:acetone and added slowly with thorough stirring to the appropriate sample of dispersion.

The results obtained are given below:

| | Appearance | General Properties | Percentage extracted | |
|---|---|---|---|---|
| | | | In (i) | In (ii) |
| (a) | Clear and glossy | Reasonably flexible, moderately hard but not tough. Slightly thermoplastic. | 21 | 100 |
| (b) | As (a) | More flexible than (a), harder than (a), and extremely tough, not thermoplastic. | <1 | 6 |
| (c) | As (a) | As (b) | <1 | 11 |
| (d) | As (a) | Slightly less flexible than (a), extremely hard and moderately tough, not thermoplastic. | <1 | 55 |

EXAMPLE 3

Plasticization of dispersions using second and third components

Portions of the dispersion of Example 2 were blended with various plasticizers (second component) plus a melamine formaldehyde resin (third component). Films were prepared and tested with solvent as in Example 1 save that no basic catalyst was added and the stoving schedule was reduced to 30 minutes at 127° C. The melamine formaldehyde resin used was hexa-isopropyl hexamethylol melamine. This was added as a 50% solution in toluene to the portions of latex in such amounts as to give a ratio of polymer solids to nitrogen resin solids of 4:1. The plasticizers used were:

(a) Butyl benzyl phthalate;
(b) Tetraglycerol tetra-butyl ether;
(c) Pentaerythritol tributyrate;
(d) Mannitol tetrabutyrate;
(e) No plasticizer addition.

With the exception of (e), all the plasticizers were added as 50% solutions in toluene to the portions of dispersion and nitrogen resin, in each case sufficient being used to give a final solids composition of 4:2:1 polymer:plasticizer:nitrogen resin.

The results obtained are tabulated below:

| | Appearance | General Properties | Percentage extracted | |
|---|---|---|---|---|
| | | | In (i) | In (ii) |
| (a) | Clear and glossy | Fairly hard and flexible but not tough. | *17 | 22 |
| (b) | As (a) | Very hard but very tough and fairly flexible. | <1 | 4 |
| (c) | As (a) | Fairly hard but tough and very flexible. | <1 | 11 |
| (d) | As (a) | As (b) | <1 | 6 |
| (e) | As (a) | Extremely hard and brittle. | <1 | 2 |

*If no plasticizer were lost during stoving, the theoretical maximum loss on extraction in (i) would be:
Plasticizer alone _____ 28%
Plasticizer and nitrogen resin _____ 43%

What we claim is:

1. A dispersion of particles of a vinyl polymer dispersed in a volatile organic liquid in which the vinyl polymer is insoluble, a solvent-type plasticizer for the polymer dissolved in said volatile organic liquid, the polymer and plasticizer each containing a complementary group selected from the class consisting of hydroxyl, epoxy, N-methylol, carboxyl, carboxylic anhydride, amino, amido, isocyanato and N-(alkoxy methyl)amido, the complementary groups being capable, on heating, of undergoing a reaction which causes the plasticizer to be chemically bound to the polymer and consequently not removable by solvent extraction and volatilization.

2. A dispersion as claimed in claim 1 in which the plasticizer has a molecular weight of from 200 to 800.

3. A dispersion as claimed in claim 1 in which the plasticizer has a molecular weight of from 300 to 600.

4. A dispersion as claimed in claim 1 in which one of the polymer and plasticizer constituents has a member of the group consisting of carboxyl and acid anhydride groups and the other has a member of the group consisting of alcohol and epoxy groups to permit reaction leading to formation of a chemical bond between the plasticizer and the polymer.

5. A dispersion as claimed in claim 1 in which one of the polymer and plasticizer constituents has amide groups and the other has hydroxyl groups to permit reaction leading to formation of a chemical bond between the plasticizer and the polymer.

6. A dispersion as claimed in claim 1 in which one of the polymer and plasticizer constituents has amine groups and the other has epoxy groups to permit reaction leading to the formation of a chemical bond between the plasticizer and the polymer.

7. A dispersion as claimed in claim 1 in which the polymer which is dispersed in said dispersion contains a member of the group consisting of hydroxyl, carboxyl, amine and amide groups and the plasticizer contains a member of the group consisting of isocyanato and blocked isocyanato groups.

8. A dispersion as claimed in claim 1 in which the polymer is an acrylate polymer selected from the group consisting of polymers and copolymers of acrylic acid, methacrylic acid and the esters, amides and nitriles thereof.

9. A dispersion as claimed in claim 1 in which the reactive vinyl polymer is located in the interior of the dispersed vinyl polymer particles and the polymer at the exterior contains no reactive groups.

10. A dispersion of a vinyl polymer as set forth in claim 1 in which there is present a third reactive component which, on heating, reacts with the plasticizer and the vinyl polymer to cause the plasticizer to be chemically bound to the polymer.

11. A dispersion as claimed in claim 10 containing as a third reactive component a masked polyisocyanate, the polymer and plasticizer containing a member of the group consisting of hydroxyl, carboxyl, amine and amide groups.

12. A dispersion as claimed in claim 10 containing as a third reactive component an alcohol-modified urea formaldehyde condensate, the polymer and plasticizer containing hydroxyl groups.

13. A dispersion as claimed in claim 10 containing as a third reactive component an alcohol-modified melamine formaldehyde condensate, the polymer and plasticizer containing a member of the group consisting of hydroxyl, carboxyl, amine and amide groups.

14. A process of coating an article with a film of vinyl polymer which comprises applying to the article a composition comprising a dispersion as claimed in claim 1 and heating the coating to evaporate the organic liquid and integrate and react the disperse polymer particles.

References Cited by the Examiner
UNITED STATES PATENTS

| | | | |
|---|---|---|---|
| 2,342,387 | 2/1944 | Catlin | 260—33.8 |
| 2,934,510 | 4/1960 | Crissey et al. | 260—86.1 |
| 2,965,607 | 12/1960 | Martin et al. | 260—30.4 |
| 2,988,524 | 6/1961 | Fitch | 260—30.4 |
| 3,035,007 | 5/1962 | Harper | 260—45.2 |
| 3,046,246 | 7/1962 | Muskat | 260—30.4 |
| 3,094,371 | 6/1963 | Van Loo et al. | 260—45.2 |
| 3,095,388 | 6/1963 | Osmond et al. | 260—4 |
| 3,122,568 | 2/1964 | Lynn et al. | 260—30.4 XR |
| 3,147,314 | 9/1964 | Cluff | 260—30.4 XR |

MORRIS LIEBMAN, *Primary Examiner.*

LEON J. BERCOVITZ, ALEXANDER H. BRODMERKEL, *Examiners.*

R. C. STEWART, A. O. DENT, B. A. AMERNICK,
*Assistant Examiners.*